Jan. 12, 1943.  R. S. EGGLESTON  2,307,828
PACKED JOINT
Filed May 1, 1942
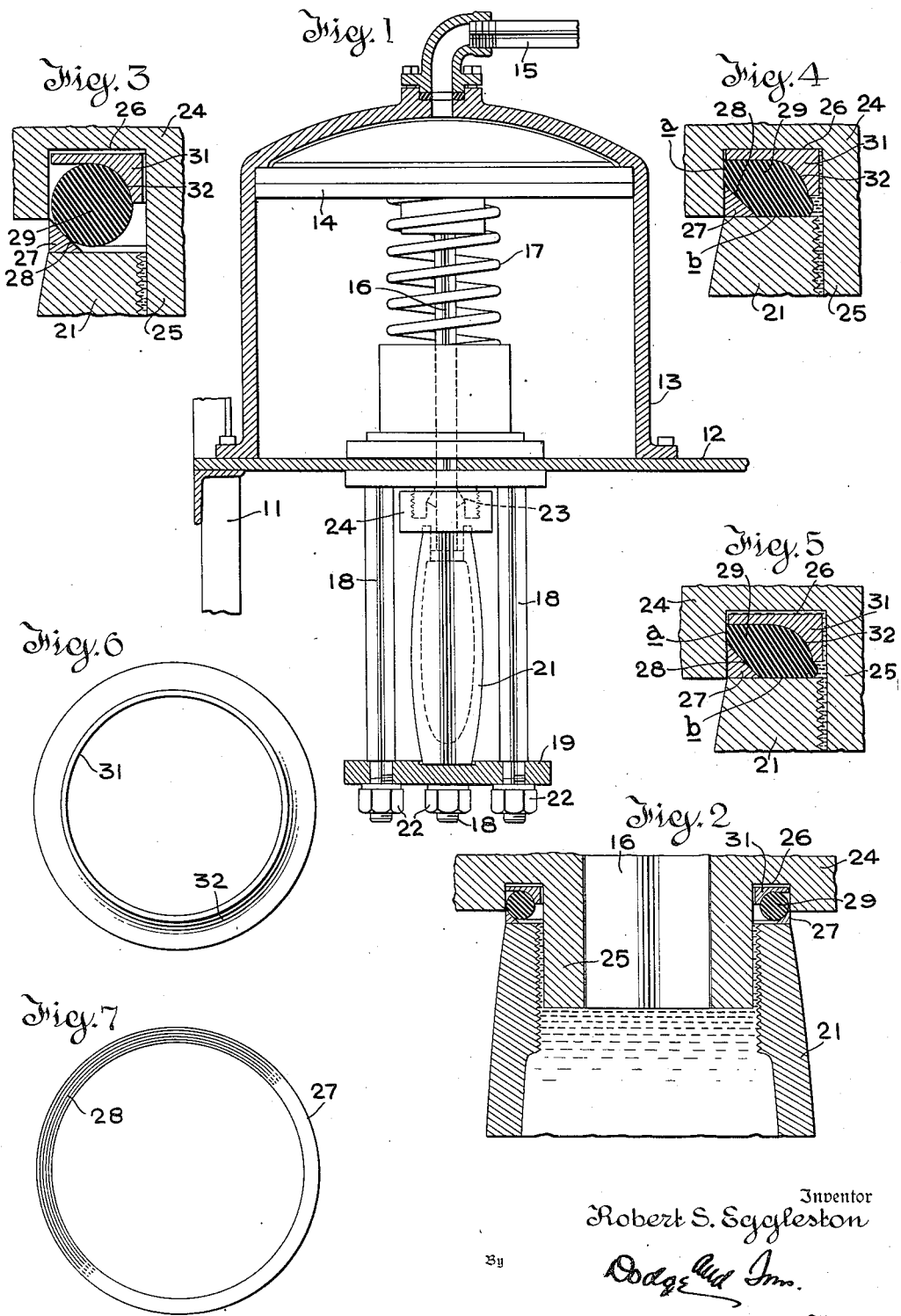
Inventor
Robert S. Eggleston
By Dodge and Inn.
Attorneys Patented Jan. 12, 1943

2,307,828

UNITED STATES PATENT OFFICE 2,307,828

PACKED JOINT

Robert S. Eggleston, Watertown, N. Y., assignor to The New York Air Brake Company, a corporation of New Jersey Application May 1, 1942, Serial No. 441,355

4 Claims. (Cl. 285—34)

This invention relates to packed joints and particularly to joints capable of resisting hydraulic pressures of the order of 25,000 pounds per square inch, used in tests of artillery shells. The joint is available for a wide range of uses including seals effective at lower pressures.

In testing shells, one practice is to fill the shell with water, seal its open end to a test device having a ram or plunger which may be forced into the shell, and then force the ram into the shell to develop hydraulically within the shell and the desired bursting pressure. In a typical machine for testing shells some three or four inches in diameter, the plunger is 1.125 inches in diameter and is driven by an air piston 18 inches in diameter, and subject to controllable air pressure up to 100 pounds per square inch or more.

It is desired to seal the annular end or nose of the shell to the test device by means which can be quickly applied, need be initially compressed with only moderate force, and will give the desired seal despite minor dimensional variations encountered in the shells.

The result is attained by providing the face against which the open end of the shell abuts with an annular groove, in which are mounted a rubber sealing ring and two specially formed rigid rings which confine and support the rubber ring. The open end of the shell engages the outer retainer ring. The inner or loading ring is subjected to the hydraulic pressure developed in the shell in such a way that increase of hydraulic pressure subjects the rubber ring to proportionally increased sealing pressure.

The rubber ring is completely confined against blowing out of the joint and also against such deformation as would prevent action of the hydraulic pressure in a sealing direction. At the same time the rubber ring is free to seal against the end of the shell and against one annular wall of the groove. It enters into initial sealing contact upon the exertion of moderate pressure and thereafter increases the sealing pressure in response to rising hydraulic pressure.

The invention is generally adaptable to sealing the end of a tube or any open ended hollow body to a plate, wherever the parts can be held in thrust engagement with each other. For illustrative purposes, the invention will be described as applied to sealing the noses of shells to hydraulic pressure testing devices, it having been used with marked success in that field.

In the drawing:

Fig. 1 is a vertical axial sectional view of the testing machine with the invention applied.

Fig. 2 is a sectional view of the seal before the initial sealing thrust is applied.

Fig. 3 is a further enlarged fragmentary section of the seal in the condition of Fig. 2.

Fig. 4 is a view similar to Fig. 3 as the seal appears after the initial sealing thrust is applied and before hydraulic pressure is developed.

Fig. 5 is a similar view showing conditions after hydraulic pressure is developed.

Fig. 6 is a view of the lower face of the loading ring.

Fig. 7 is a view of upper face of the retaining ring.

A part of the frame of the testing machine appears at 11 and sustains a horizontal plate 12. Mounted on plate 12 is a single acting air cylinder 13 with piston 14 and air connection 15. The piston actuates a ram 16 and is moderately biased to move upward by a coil compression spring 17.

Slung below plate 12 by rods 18 is a platform 19 which sustains shell 21 and which may be drawn upward by nuts 22 on the rods 18 to hold the shell against the seal. The ram 16 passes through a packing gland 23 which serves to prevent upward leakage of water into the lower end of the air cylinder 13. This gland 23 has a gland nut 24 and this gland nut is the "platelike member" with which the upper end of shell 21 is to seal.

Refer now to Fig. 2.

The gland nut 24 is shown as formed with a projecting collar 25 which guides ram 16 and which enters the internally threaded nose or end of shell 21. This ensures displacement of some water from the shell as it is mounted, and thus precludes the existence of any cushioning air pocket within the shell.

Surrounding collar 25 is an annular groove 26 whose outer diameter approximates the outer diameter of the shell nose and whose inner diameter is less than that of the threaded bore of the shell. The inner wall of the groove is shown as a continuation of the outer surface of collar 25. This is convenient but not essential.

The hydraulic pressure to be resisted by the seal acts outward, and the specific locations of parts of the seal about to be described depend on that fact.

Resting on the upper end of the shell 21 is a retainer ring 27. This is triangular in cross-section and, as shown, covers less than the outer half of the annular area at the nose of shell 21. It telescopes neatly into the outer wall of groove 26, and has a beveled face 28 inclined at about 45° of angle to the axis of the shell.

On the retainer ring is gasket 29 of rubber or rubber-like material. Geometrically the gasket is a torus. However, a circular cross-section, though convenient, is not indispensible.

Above the gasket is a loading or confining ring 31, flanged or angular in cross-section. One flange overlies the gasket 29 and the other extends between the gasket and collar 25, so as to resist displacement of the gasket inward. The gasket-engaging face 32 is a rounded groove.

The parts having been assembled, as shown in Figs. 2 and 3, tightening of the nuts 22 deforms the gasket as shown in Fig. 4. This produces two annular sealing areas, a and b, each adjacent a corresponding edge of retainer ring 27.

Development of hydraulic pressure further deforms the gasket and intensifies the pressure of the gasket in areas a and b. Experience with the seal in commercial use in testing shells demonstrates that the seal is unusually effective and is convenient from the manipulative aspect.

The question immediately arises whether it is necessary to construct the so-called loading ring 31 as a separate element or whether it would be practicable to profile the groove in the gland nut 24 so that the nut itself would afford the grooved contour defined by the lower face of the loading ring 31.

From the manufacturing standpoint there is a definite advantage in constructing the loading ring 31 as a separate element. This permits manufacture of the ring 31, as well as the ring 37, of suitable strong alloy steel, preferably chrome vanadium steel. Machining considerations, as well as the need for conserving steel of this character, each dictate the use of a separate loading ring, but the separate ring has been proved to have functional advantages as well.

An attempt to indicate this is made in the exaggerated diagrammatic Figure 5. The hydraulic pressure fluid against which the seal acts can penetrate between the loading ring 31 and the bottom of the grooves 26 because the net upward thrust on the ring 31 is merely the force developed by the mechanical compression of the rubber ring 29. This ring 29 is directly subject to hydraulic loading. Hence, even after the ring 29 is compressed, the ring 31 is more nearly free to center itself than would appear on casaul consideration, and apparently does shift to perfect the seal.

Tests made with the contoured groove, that is, with a groove whose contour conforms to the lower face of the separate ring 31 demonstrate that an adequate seal can be had, but that it has a tendency to leak when the hydraulic pressure is first developed. Consequently, while the invention is broad enough to include this alternative structure, the specific construction illustrated in the drawing has an additional functional advantage, and thus involves patentable features inherent in the use of the ring 31 as a separate element.

Various other modifications which will readily suggest themselves fall within the scope of the invention as defined in the claims.

What is claimed is:

1. Means forming a seal between the end of a tubular member, and a plate-like member toward which the end of the tubular member is presented comprising in combination, means affording an annular confining channel in the face of the plate-like member, the channel being opposed to and approximately conforming in dimension to the end of the tubular member; a rigid sustaining ring of sufficient strength to resist the fluid pressure to be sealed against, seated on and covering only part of the annular end of the tubular member and telescoping with a wall of and entering only part way into said channel; a deformable annular gasket of rubberlike material overlying and sustained by said ring and capable when compressed of sealing with the end of the tubular member and with a wall of said groove along annular areas adjacent said sustaining ring; means associated with said channel and affording an annular face concave in cross-section and diagonally opposed to said sustaining ring; and means for sustaining said tubular member under sufficient thrust toward the plate-like member to compress the gasket until it seals with the end of the tubular member and a side of the channel.

2. The combination defined in claim 1 in which the sustaining ring is generally triangular in cross-section with its gasket-engaging face at approximately 45° to the other faces.

3. Means forming a seal between the end of a tubular member, and a plate-like member toward which the end of the tubular member is presented comprising in combination, means affording an annular confining channel in the face of the plate-like member, the channel being opposed to and approximately conforming in dimension to the end of the tubular member; a rigid sustaining ring of sufficient strength to resist the fluid pressure to be sealed against, seated on and covering only part of the annular end of the tubular member and telescoping with a wall of and entering only part way into said channel; a deformable annular gasket of rubberlike material overlying and sustained by said ring and capable when compressed of sealing with the end of the tubular member and with a wall of said groove along annular areas adjacent said sustaining ring; an overlying loading ring freely mounted on said channel, said loading ring being of generally angular cross-section and being mounted with its angle disposed in said channel diagonally opposite the sustaining ring; and means for sustaining said tubular member under sufficient thrust toward the plate-like member to compress the gasket until it seals with the end of the tubular member and a side of the channel.

4. The combination defined in claim 3 in which the sustaining ring is generally triangular in cross-section with its gasket-engaging face at approximately 45° to the other faces, and the loading ring has a rounded concave cross-section opposed to the gasket-engaging face of the sustaining ring.

ROBERT S. EGGLESTON.